(12) United States Patent
Szeremeta et al.

(10) Patent No.: US 9,360,900 B1
(45) Date of Patent: *Jun. 7, 2016

(54) CAPTIVATING SHOCK MOUNTS FOR DATA STORAGE DEVICES USING RETENTION CLIPS

(71) Applicant: Western Digital Technologies, Inc., Irvine, CA (US)

(72) Inventors: Wally Szeremeta, Mission Viejo, CA (US); Brian S. Nihei, Fountain Valley, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 214 days.

This patent is subject to a terminal disclaimer.

(21) Appl. No.: 14/077,042

(22) Filed: Nov. 11, 2013

Related U.S. Application Data (60) Provisional application No. 61/868,456, filed on Aug. 21, 2013.

(51) Int. Cl.
*G06F 1/20* (2006.01)
*G06F 1/18* (2006.01)

(52) U.S. Cl.
CPC ............. *G06F 1/187* (2013.01); *G06F 1/182* (2013.01)

(58) Field of Classification Search
CPC .................................. G11B 33/08; G06F 1/20
USPC ..................................................... 361/679.34
See application file for complete search history.

(56) References Cited

U.S. PATENT DOCUMENTS

| | | | |
|---|---|---|---|
| 4,713,714 A | 12/1987 | Gatti et al. | |
| 4,831,476 A | 5/1989 | Branc et al. | |
| 5,004,207 A | 4/1991 | Ishikawa et al. | |
| 5,041,924 A | 8/1991 | Blackborow et al. | |
| 5,081,551 A | 1/1992 | Aruga | |
| 5,124,855 A | 6/1992 | Dew et al. | |
| 5,216,582 A | 6/1993 | Russell et al. | |
| 5,223,996 A | 6/1993 | Read et al. | |
| 5,285,545 A | 2/1994 | Payne et al. | |
| 5,349,486 A | 9/1994 | Sugimoto et al. | |
| 5,463,527 A | 10/1995 | Hager et al. | |
| 5,535,092 A | 7/1996 | Bang | |
| 5,654,875 A | 8/1997 | Lawson | |
| 5,694,267 A | 12/1997 | Morehouse et al. | |
| 5,726,834 A | 3/1998 | Eckberg et al. | |
| 5,757,617 A | 5/1998 | Sherry | |
| 5,777,821 A | 7/1998 | Pottebaum | |
| 5,949,619 A | 9/1999 | Eckberg et al. | |

(Continued)

FOREIGN PATENT DOCUMENTS

EP 0355534 2/1990

OTHER PUBLICATIONS

Peter A. Masterson, "Isolation Techniques for 2.5-Inch Hard Disk Drives", https://www.earsc.com, 4 pages.

(Continued)

*Primary Examiner* — Forrest M Phillips (57) ABSTRACT

A data storage assembly including an enclosure including a first set of one or more pockets for receiving a first set of one or more shock mounts configured to be coupled to a data storage device, a cover configured to enclose the enclosure, and a set of one or more retention clips separate from the cover and configured to latch with the first set of one or more pockets to retain the first set of one or more shock mounts.

21 Claims, 11 Drawing Sheets

(56) References Cited

U.S. PATENT DOCUMENTS

| | | |
|---|---|---|
| 5,958,212 A | 9/1999 | Yamamura et al. |
| 6,125,097 A | 9/2000 | Wu |
| 6,130,817 A | 10/2000 | Flotho et al. |
| 6,154,360 A | 11/2000 | Kaczeus, Sr. et al. |
| 6,166,901 A | 12/2000 | Gamble et al. |
| 6,249,432 B1 | 6/2001 | Gamble et al. |
| 6,275,352 B1 | 8/2001 | Tadepalli et al. |
| 6,281,433 B1 | 8/2001 | Decker et al. |
| 6,285,545 B1 | 9/2001 | Lopez |
| 6,292,359 B1 | 9/2001 | Boe |
| 6,487,039 B1 | 11/2002 | Bernett |
| 6,496,362 B2 | 12/2002 | Osterhout et al. |
| 6,498,722 B1 | 12/2002 | Stolz et al. |
| 6,545,865 B2 | 4/2003 | Zamora et al. |
| 6,567,265 B1 | 5/2003 | Yamamura et al. |
| 6,618,246 B2 | 9/2003 | Sullivan et al. |
| 6,714,405 B2 | 3/2004 | Jitsukawa |
| 6,751,092 B1 | 6/2004 | Ohnishi et al. |
| 6,873,524 B2 | 3/2005 | Kaczeus, Sr. et al. |
| 6,958,884 B1 | 10/2005 | Ojeda et al. |
| D512,422 S | 12/2005 | Sato et al. |
| 7,106,582 B2 | 9/2006 | Albrecht et al. |
| 7,106,583 B2 | 9/2006 | Koh et al. |
| 7,187,543 B2 | 3/2007 | Zimlin |
| 7,215,506 B2 | 5/2007 | Albrecht et al. |
| 7,227,761 B2 | 6/2007 | Estes et al. |
| 7,251,131 B2 | 7/2007 | Shah et al. |
| 7,312,982 B2 | 12/2007 | Bruner et al. |
| 7,375,922 B2 * | 5/2008 | Chen et al. ............... 360/97.19 |
| 7,450,375 B2 | 11/2008 | Xu |
| 7,471,509 B1 | 12/2008 | Oliver |
| 7,480,136 B2 | 1/2009 | Lalouette |
| 7,483,238 B2 | 1/2009 | Xu et al. |
| 7,561,375 B2 | 7/2009 | Kim et al. |
| 7,667,925 B2 | 2/2010 | Kim et al. |
| 7,701,705 B1 | 4/2010 | Szeremeta |
| 7,817,373 B2 | 10/2010 | Choi et al. |
| 8,064,194 B2 | 11/2011 | Szeremeta |
| 8,113,873 B1 | 2/2012 | Sarraf |
| 8,133,426 B1 | 3/2012 | Yurchenco et al. |
| 8,300,352 B1 * | 10/2012 | Larson et al. ............... 360/97.11 |
| 8,358,395 B1 | 1/2013 | Szeremeta |
| 8,417,979 B2 | 4/2013 | Maroney |
| 8,462,460 B1 * | 6/2013 | Szeremeta et al. ......... 360/97.19 |
| 8,498,088 B1 | 7/2013 | Klein |
| 8,547,658 B1 * | 10/2013 | Szeremeta ................ 360/97.19 |
| 8,705,201 B2 | 4/2014 | Casey et al. |
| 2003/0174464 A1 | 9/2003 | Funawatari et al. |
| 2004/0032711 A1 | 2/2004 | Kaczeus, Sr. et al. |
| 2004/0190193 A1 | 9/2004 | Kuwajima |
| 2004/0255313 A1 | 12/2004 | Kaczeus, Sr. et al. |
| 2005/0088778 A1 * | 4/2005 | Chen et al. ................ 360/97.02 |
| 2005/0180045 A1 | 8/2005 | Tsuda et al. |
| 2005/0185326 A1 | 8/2005 | Bruner et al. |
| 2005/0275966 A1 | 12/2005 | Janik et al. |
| 2006/0001992 A1 | 1/2006 | Friedrichs |
| 2006/0002076 A1 | 1/2006 | Albrecht et al. |
| 2006/0158775 A1 | 7/2006 | Sega et al. |
| 2007/0025014 A1 * | 2/2007 | Kim ........................ 360/97.01 |
| 2007/0076327 A1 | 4/2007 | Yang et al. |
| 2007/0133121 A1 | 6/2007 | Xu et al. |
| 2007/0133122 A1 | 6/2007 | Kim et al. |
| 2010/0290154 A1 | 11/2010 | Kim et al. |

OTHER PUBLICATIONS

Seagate "Disc Drive Acoustics", Oct. 2001, 7 pages.

Shawn Casey, "Hard Drive Mounting in Notebook Computer Systems", 2579-771615-A00-P2, Feb. 2011, 29 pages, Western Digital White Paper available at www.wdc.com.

U.S. Appl. No. 13/655,297, filed Oct. 18, 2012, Wally Szeremeta, pp. 19.

Notice of Allowance dated Feb. 14, 2013 from U.S. Appl. No. 13/434,772, 20 pages.

* cited by examiner

CAPTIVATING SHOCK MOUNTS FOR DATA STORAGE DEVICES USING RETENTION CLIPS

CROSS-REFERENCE TO RELATED APPLICATION

This application claims the benefit of U.S. Provisional Application No. 61/868,456, filed on Aug. 21, 2013, which is hereby incorporated by reference in its entirety.

BACKGROUND

Due to their sensitive components, disk drives are vulnerable to externally induced shocks and vibrations. Because magnetic disk drives are predominantly designed for operation in stationary environments, external shock and vibration protection is often required to improve the robustness of disk drives in mobile applications. To fulfill this requirement, protective cases having vibration and shock dampening characteristics are often used to carry and transport small external disk drives.

It is a common practice to provide internal shock and vibration isolation to a portable disk drive encased in a plastic enclosure. Conventionally, elastomeric mounts having various geometric shapes are used to support the disk drive and to provide the necessary shock and vibration isolation within its enclosure. Typically, these elastomeric mounts are often custom-molded to fit the disk drive assembly and the enclosure. However, this results in different elastomeric mount designs and different elastomeric mount supporting structures that are only suitable for a single disk drive model or a small number of disk drive models.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
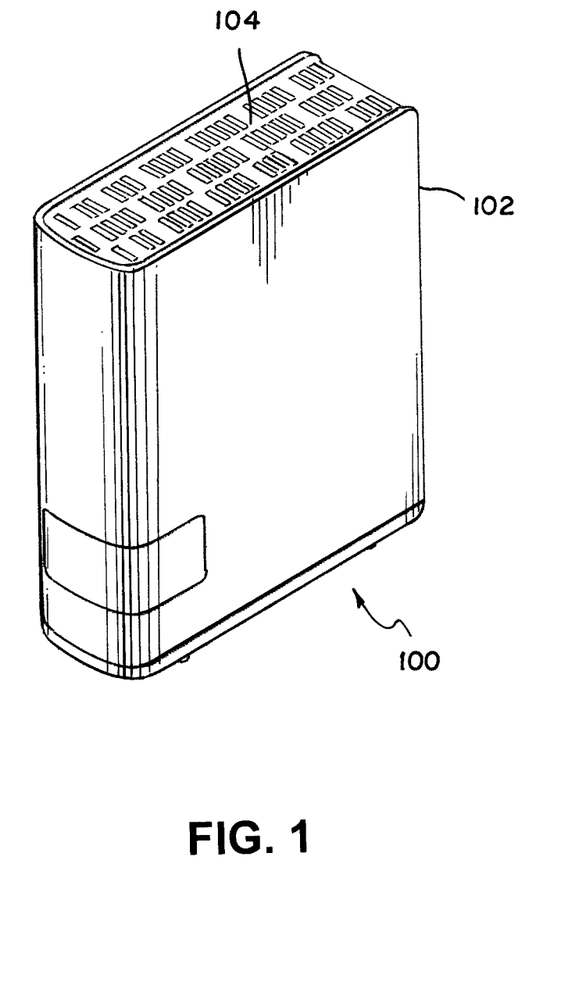
FIG. 1 depicts a data storage assembly according to an embodiment.

In an embodiment, a data storage assembly 100 comprising an enclosure 104 and a cover 102 are shown in an embodiment in FIG. 1. In an embodiment, the data storage assembly 100 comprises a direct access storage ("DAS") device or a network access storage ("NAS") device. In an embodiment, the data storage assembly 100 is configured to be connected to a host. Furthermore, in an embodiment, the data storage assembly 100 can be configured to be connected to a host either directly or through a network.

In the embodiment shown in FIG. 2, the enclosure 104 can store a data storage device 106 at least partially using a set of one or more retention clips 108, which will be described in more detail later. In an embodiment, the enclosure 104, the cover 102, or any combination thereof comprise plastic.

In an embodiment, the data storage device 106 comprises at least one of a disk drive or a solid state drive. In an embodiment, the disk drive comprises a magnetic rotating disk. In an embodiment, the solid state drive comprises a solid state memory. In an embodiment, the disk drive comprises a 3.5 inch disk drive.

While the description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Figure 3:
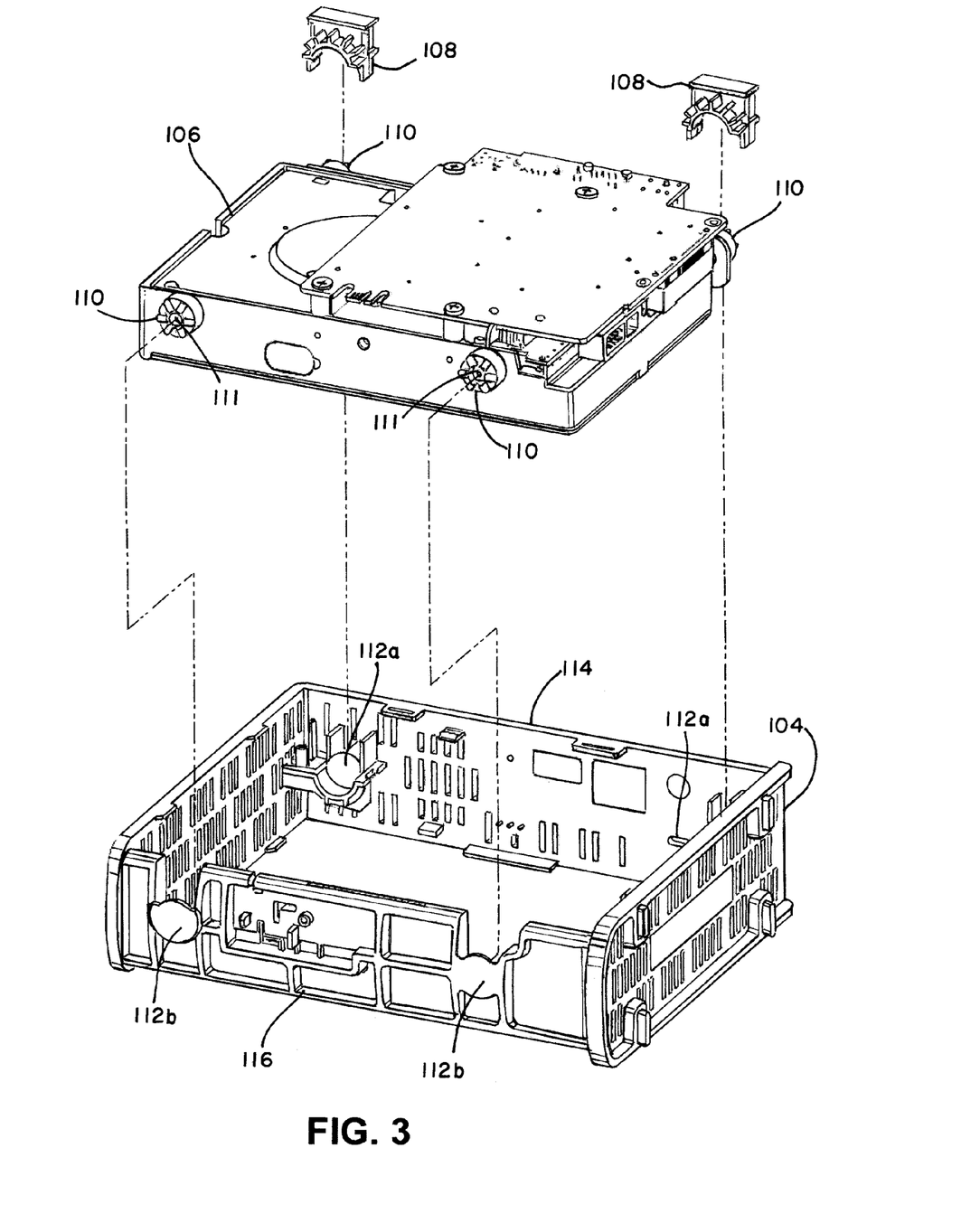
FIG. 3 depicts a data storage assembly with a data storage device separated from an enclosure according to an embodiment.

In an embodiment shown in FIG. 3, one or more threaded inserts 111 are attached to the data storage device 106. Furthermore, in an embodiment, one or more shock mounts 110 are attached to the threaded inserts 111. In an embodiment, the shock mounts comprise shock absorbers to reduce shock to the data storage device 106.

Figure 4:
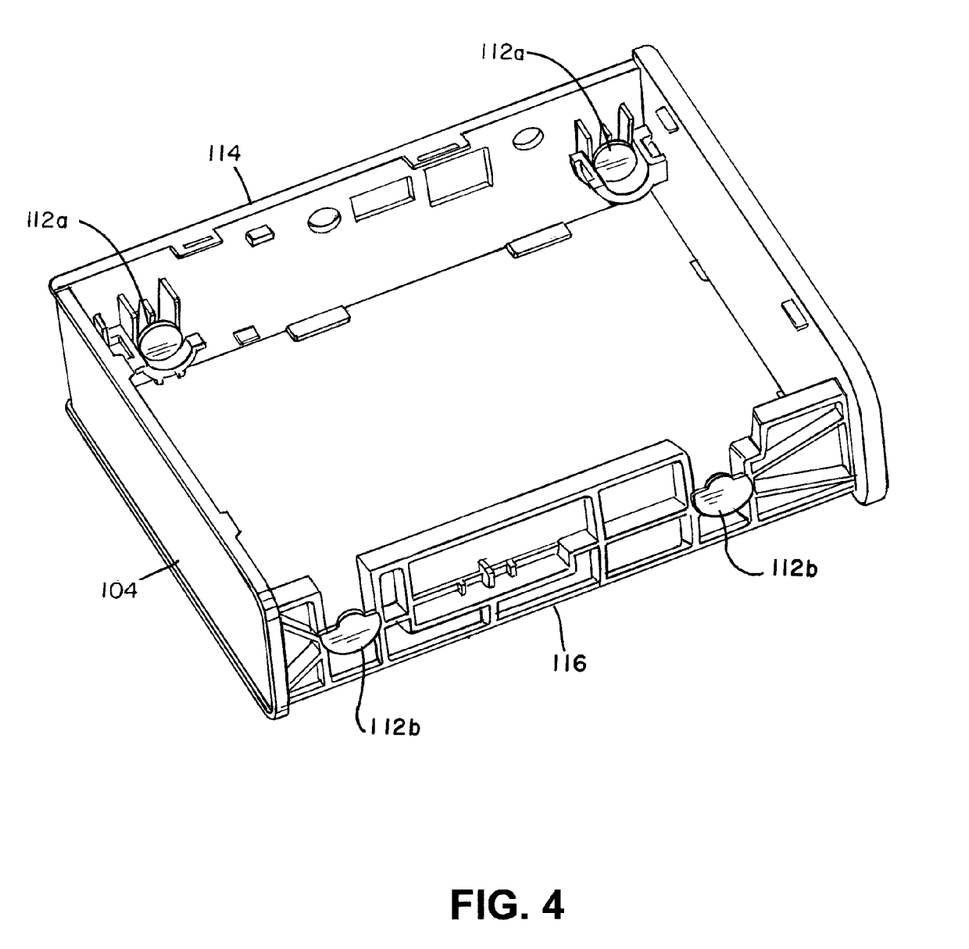
FIG. 4 depicts a partial view of an enclosure according to an embodiment.
Figure 5:
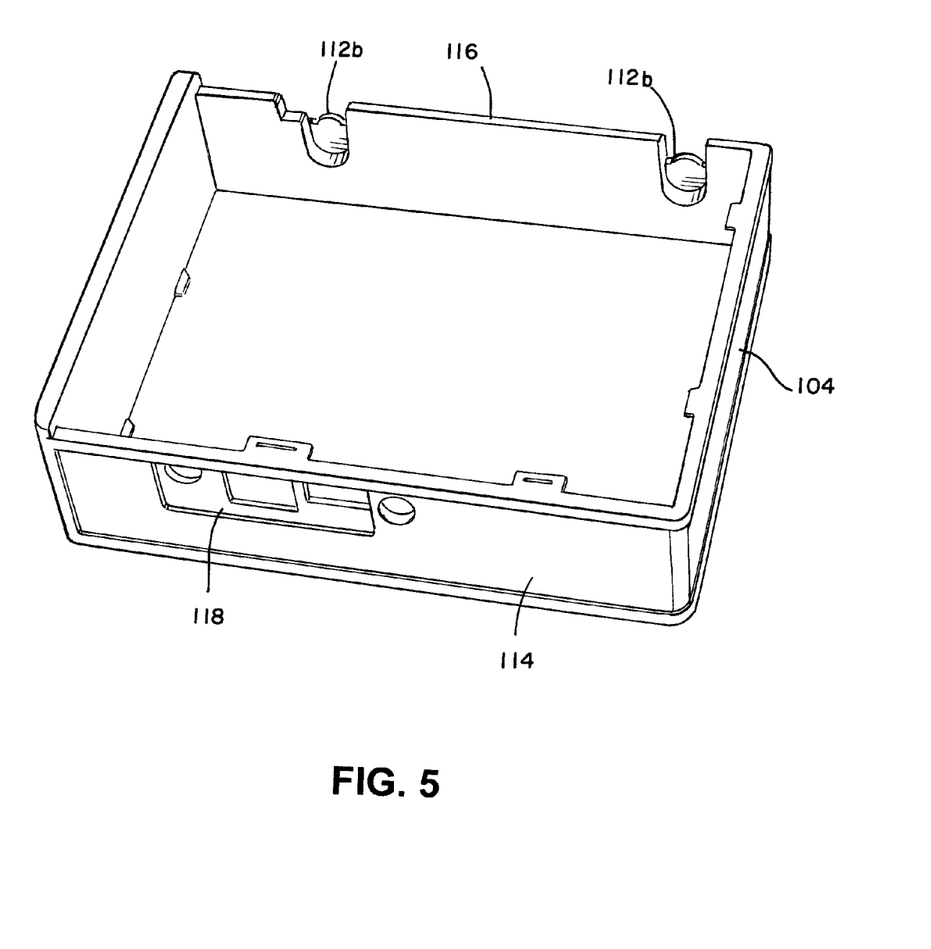
FIG. 5 depicts a partial view of an enclosure according to an embodiment.

Furthermore, in the embodiments shown in FIG. 3, the data storage device 106 is placed in the enclosure 104. As can be seen in the embodiment shown in FIG. 3, the enclosure comprises one or more shock mount retention units such as captivating pockets to receive the shock mounts 110 attached to the data storage device 106. In embodiments shown in FIGS. 3, 4, and 5, a first set of captivating pockets 112a are located in a first side 114 of the enclosure 104, and a second set of captivating pockets 112b are located in a second side 116 of the enclosure 104.

In an embodiment, each set of captivating pockets comprise one or more captivating pockets. In an embodiment, the first side 114 of the enclosure 104 comprises a back side of the enclosure 104, while the second side 116 of the enclosure 104 comprises a front side of the enclosure 104. In an embodiment shown in FIG. 5, the first side 114 of the enclosure 104 is configured to include apertures 118 for receiving connection interfaces from cable such as Universal Serial Bus (USB) cables, network cables, or other types of communicating cables.

In an embodiment, each of the captivating pockets in the first set of captivating pockets 112*a* is configured to mate with the retention clip 108. In an embodiment, the retention clip 108 comprises a shock mount retention clip. In an embodiment, the retention clip 108 comprises plastic. In an embodiment, the use of the retention clip 108 reduces manufacturing costs relative to the use of metal screws. Furthermore, in an embodiment, the use of the retention clip 108 may reduce manufacturing costs and time by utilizing a top down approach to assembly such as in a semi-automated or fully automated process. That is, the retention clips 108 can be placed in a same direction as a placement of the data storage device 106 onto the enclosure.

Figure 6:
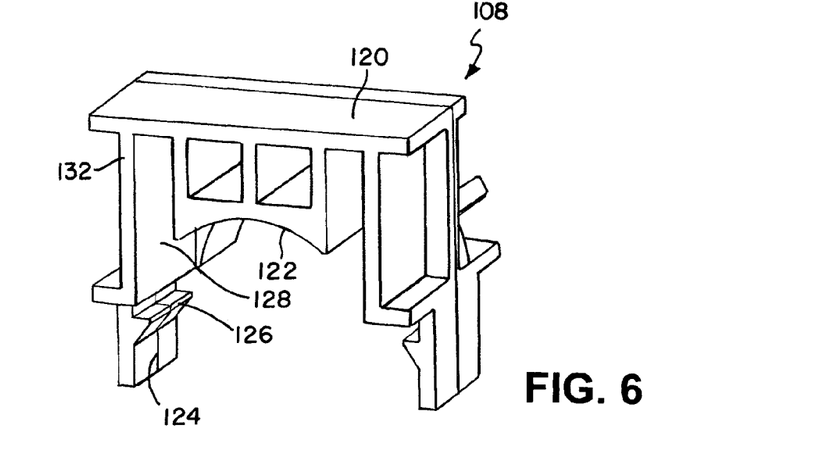
FIG. 6 depicts a perspective view of a retention clip according to an embodiment.
Figure 7:
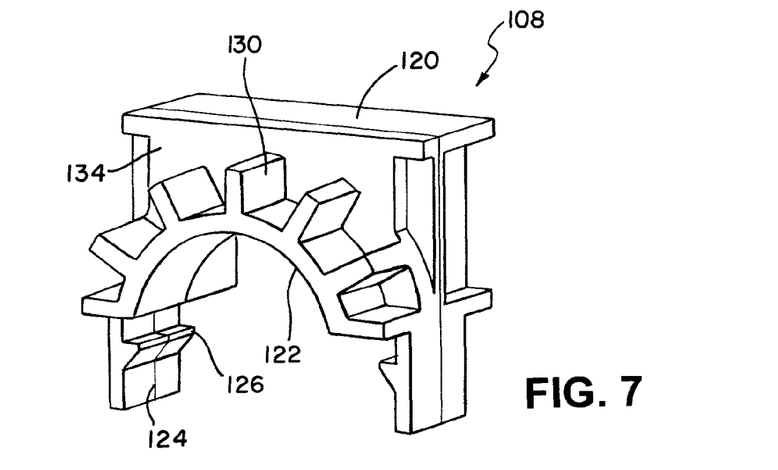
FIG. 7 depicts a perspective view of a retention clip according to an embodiment.
Figure 8:
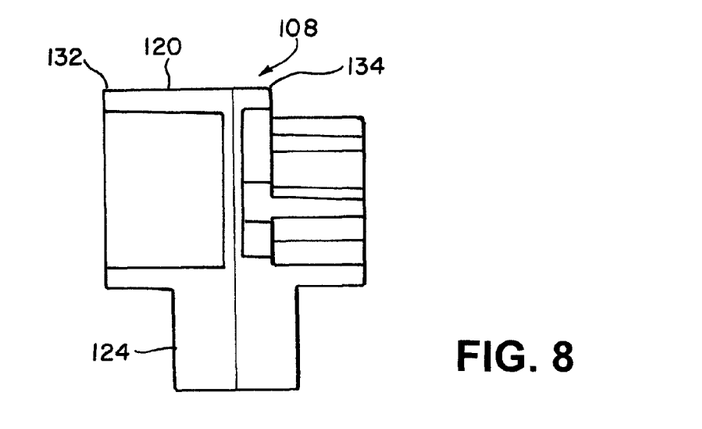
FIG. 8 depicts a side view of a retention clip according to an embodiment.

In an embodiment, a retention clip 108 is shown in FIGS. 6, 7, and 8. A first side 132 of the retention clip 108 is shown in an embodiment in FIG. 6 and a second side 134 of the retention clip of the retention clip 108 is shown in an embodiment in FIG. 7. A side view of the retention clip 108 is shown in an embodiment in FIG. 8. In an embodiment, when the retention clip 108 is mated with a captivating pocket, the second side 134 of the retention clip 108 is configured to face the data storage device 106, while the first side 132 of the retention clip 108 is configured to face the enclosure 104.

As can be seen in the embodiment in FIG. 7, the retention clip 108 comprises a shock mount retention surface 122, which contacts the shock mount 110 (FIG. 3) when the retention clip 108 is secured and mated with the captivating pocket 112*a*. In an embodiment, the shock mount retention surface 122 comprises a partially circular surface. In an embodiment, the shock mount retention surface 122 comprises a semicircle. In an embodiment, the retention clip 108 and the captivating pocket 112*a* cooperate to retain the shock mount 110. In an embodiment, the retention clip 108 also comprises a pocket to retain the shock mount 110.

In the embodiment shown in FIGS. 6, 7, and 8, the retention clip 108 comprises a surface 120 for an assembly press to apply force to the retention clip 108. In an embodiment, the retention clip 108 comprises one or more latching units. In an embodiment, the latching units comprise one or more beams such as latching beams 124. In an embodiment, the captivating pockets 112*a* also comprise one or more latching units, which will be described in more detail below. In an embodiment, the latching unit in the captivating pocket 112*a* comprises a flange.

In an embodiment, the assembly press can apply sufficient force to the retention clip 108 so that the latching beam 124 in the retention clip 108 will latch with a corresponding latching unit in the captivating pocket. In an embodiment, when the latching beam 124 is latched with the flange in the captivating pocket 112*a*, the retention clip 108 is secured to the captivating pocket 112*a*.

In an embodiment, the retention clip also 108 comprises one or more radial ribs 130 opposite the shock mount retention surface 122. When force is applied to the retention clip 108 to latch the latching beam 124 to the flange, the latching beam 124 can expand outwards. The radial ribs 130 can provide stiffness to the shock mount retention surface to reduce deformation or damage to the shock mount retention surface when the latching beam is expanding outwards.

As can be seen in the embodiment shown in FIGS. 6 and 7, the latching beam 124 comprises a ramp 126. The ramp 126 is located at an angle to the latching beam 124. When the ramp 126 latches with a bottom portion of the flange, the retention clip 108 is secured to the captivating pocket.

In an embodiment shown in FIG. 6, the retention clip 108 also comprises a set of one or more alignment feature 128 which can cooperate with a corresponding alignment features in the captivating pockets 112*a*. In an embodiment, the alignment feature 128 can ensure that the retention clip 108 will be properly mated and secured to the captivating pocket 112*a* when force is placed on the retention clip 108. In the embodiment shown in FIG. 6, the alignment features 128 in the retention clip 108 comprise one or more grooves.

Figure 9:
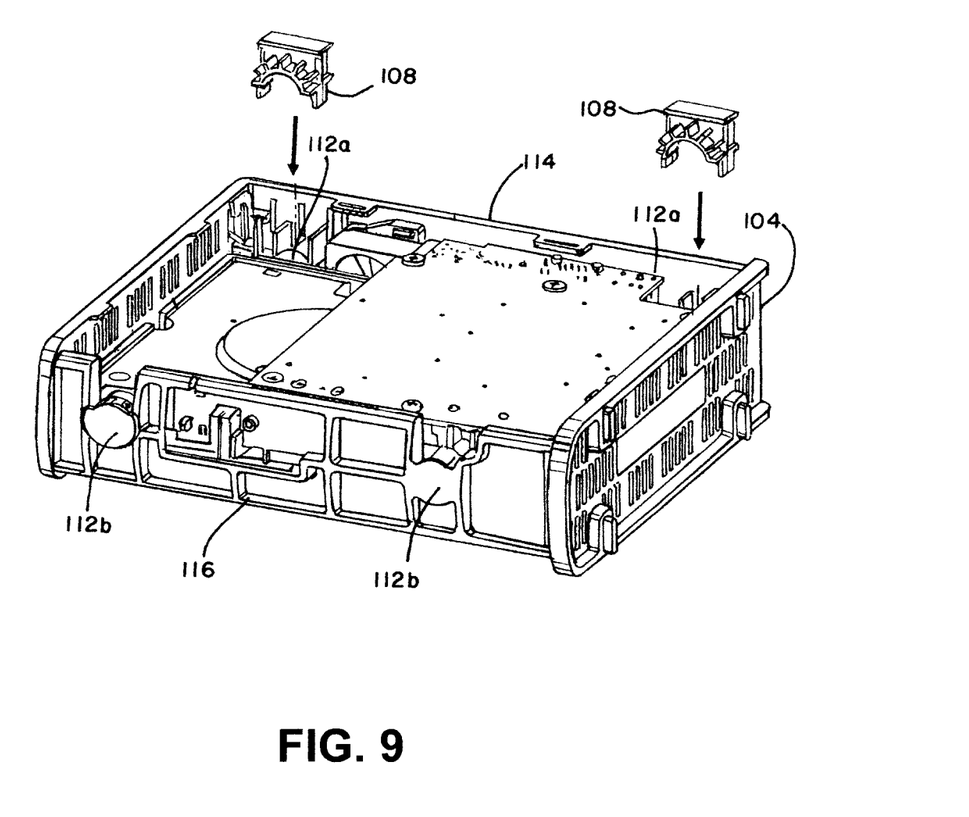
FIG. 9 depicts a perspective of an installation of a retention clip.
Figure 10:
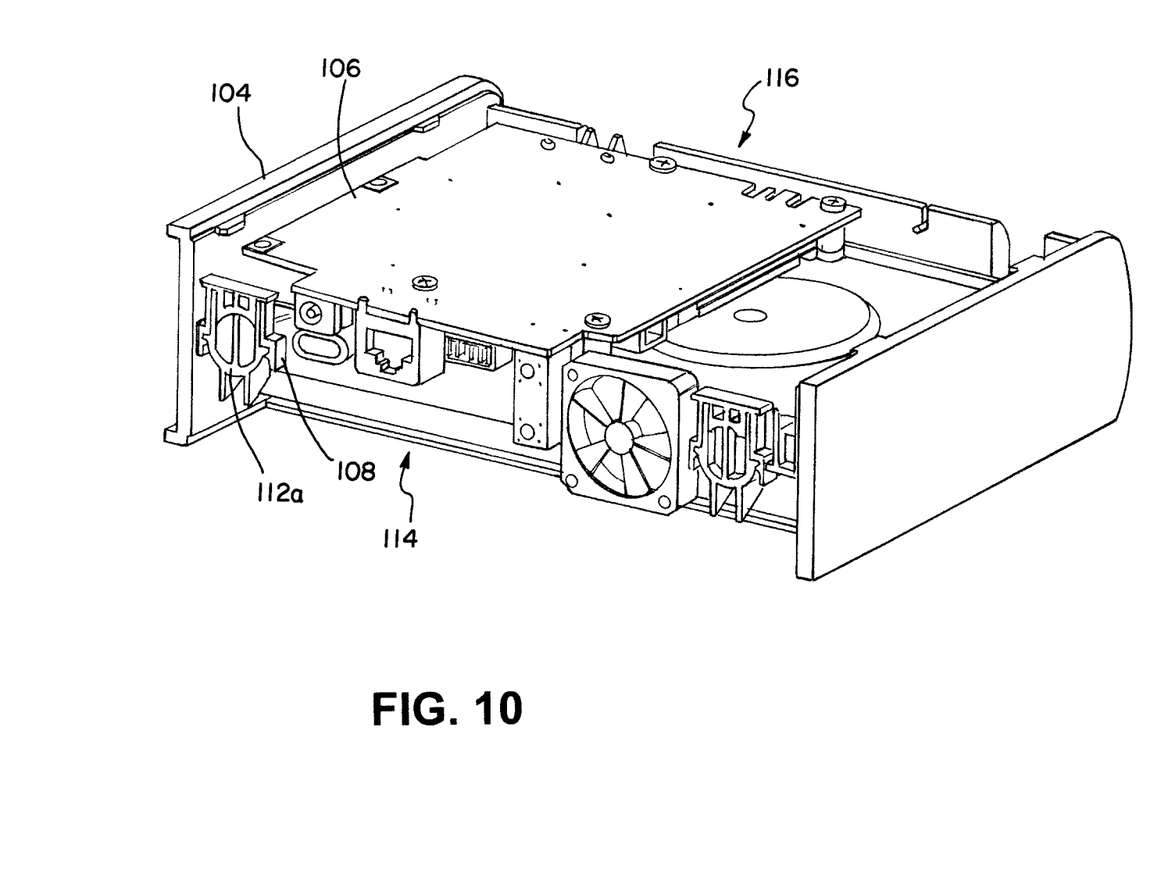
FIG. 10 depicts a perspective view of an enclosure with retention clips mated with captivating pockets.

In an embodiment shown in FIG. 9, the retention clip 108 is secured to the captivating pocket to secure by placing the retention clips 108 over the first set of captivating pockets 112*a*. In embodiments shown in FIG. 10, the retention clips 108 are secured to the first set of captivating pockets 112*a*.

Figure 11:
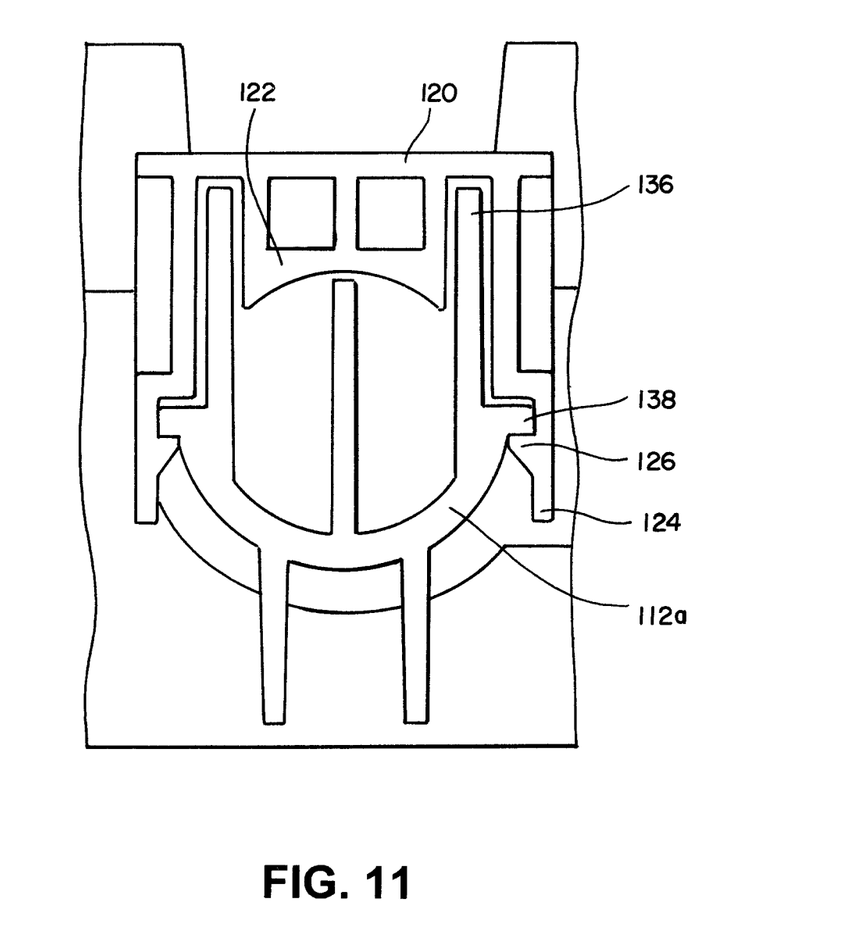
FIG. 11 depicts a partial view of a retention clip mated with a captivated pocket.

In an embodiment, a side view of the retention clip 108 mated with the captivating pocket 112*a* is shown in FIG. 11. As can be seen in the embodiment shown in FIG. 11, the alignment features 136 in the captivating pocket comprise one or more rails which slide into the grooves in the retention clip 108. Furthermore, as can be seen, the ramp 126 in the latching beam 124 of the retention clip 108 is latched with a bottom portion of a flange 138 in the captivating pocket 112*a*. Thus, the retention clip 108 is prevented from being moved in a direction away from the captivating pocket by the ramp 126 and the flange 138.

Furthermore, as shown in the embodiment in FIG. 11, to install the retention clip 108, force is applied to the retention clip 108 to push the retention clip 108 towards the captivating pocket 112*a*. When the ramp 126 first contacts the flange 138 at a top side of the flange 138, the latching beam 124 will expand outwards so that the ramp 126 can move past the flange 138. When the ramp 126 moves past the flange 138, the latching beam 124 will contract backwards and the ramp 126 will thus be located below the flange 138 and be configured to contact a bottom side of the flange 138. The ramp 126 is thus latched with the flange 138.

However, when force is applied to the retention clip 108 to move the retention clip 108 away from the captivating pocket 112*a*, the ramp 126 will contact the flange 138 and prevent the retention clip 108 from being moved in that direction. In an embodiment, to remove the retention clip 108, force can be applied to the latching beam 124 to expand the latching beam 124 outwards so that the ramp 126 can move past the flange 138.

Figure 12:
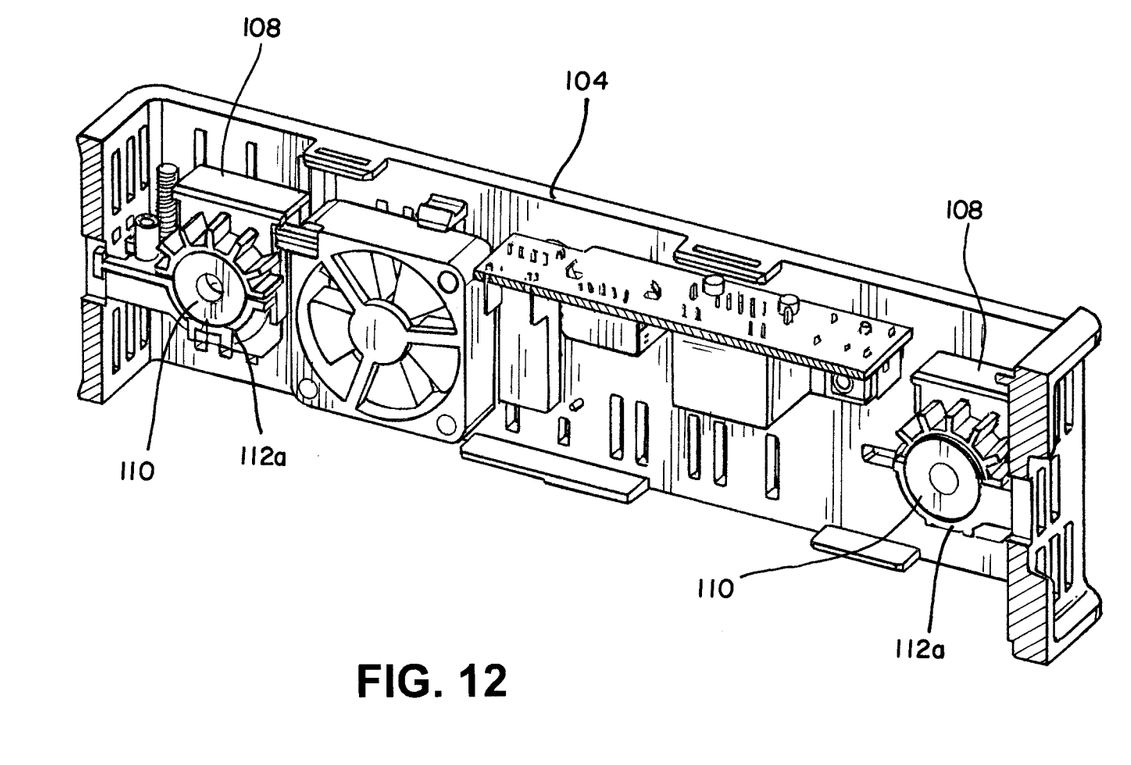
FIG. 12 depicts a partial view of an enclosure with retention clips mated with captivating pockets to captivate shock mounts.

In an embodiment, a perspective view of the retention clip 108 and the captivating pocket 112*a* cooperating to captivate the shock mounts 110 is shown in FIG. 12. As can be seen in the embodiment in FIG. 12, the retention clip 108 and the captivating pocket 112*a* reduce the movement of the shock mounts 110.

Although the latching units for the retention clips 108 in the examples above are shown as comprising latching beams and ramps, and the latching units for the captivating pockets 112*a* are shown as comprising flanges, in an embodiment, the latching units for the retention clips can comprise flanges and the latching units for the captivating pockets 112*a* can comprise latching beams and ramps. In addition, in an embodiment, the latching units for the retention clips 108 and the latching units for the captivating pockets 112*a* can comprise other mechanical devices which can be used to removably secure the retention clips 108 to the captivating pockets 112*a*.

Furthermore, although the alignment features 128 (FIG. 6) in the examples above are shown as being grooves and the alignment features 136 (FIG. 11) are shown as being rails, in an embodiment, the alignment features 128 (FIG. 6) can comprise rails while the alignment features 136 (FIG. 11) can comprise grooves. Similarly, other cooperative features which can guide the retention clip 108 onto the captivating pockets 112*a* may be utilized. In addition, although two retention clips 108 and two captivating pockets 112*a* are shown, additional or less amounts of retention clips 108 and captivating pockets 112a may be utilized.

Figure 2:
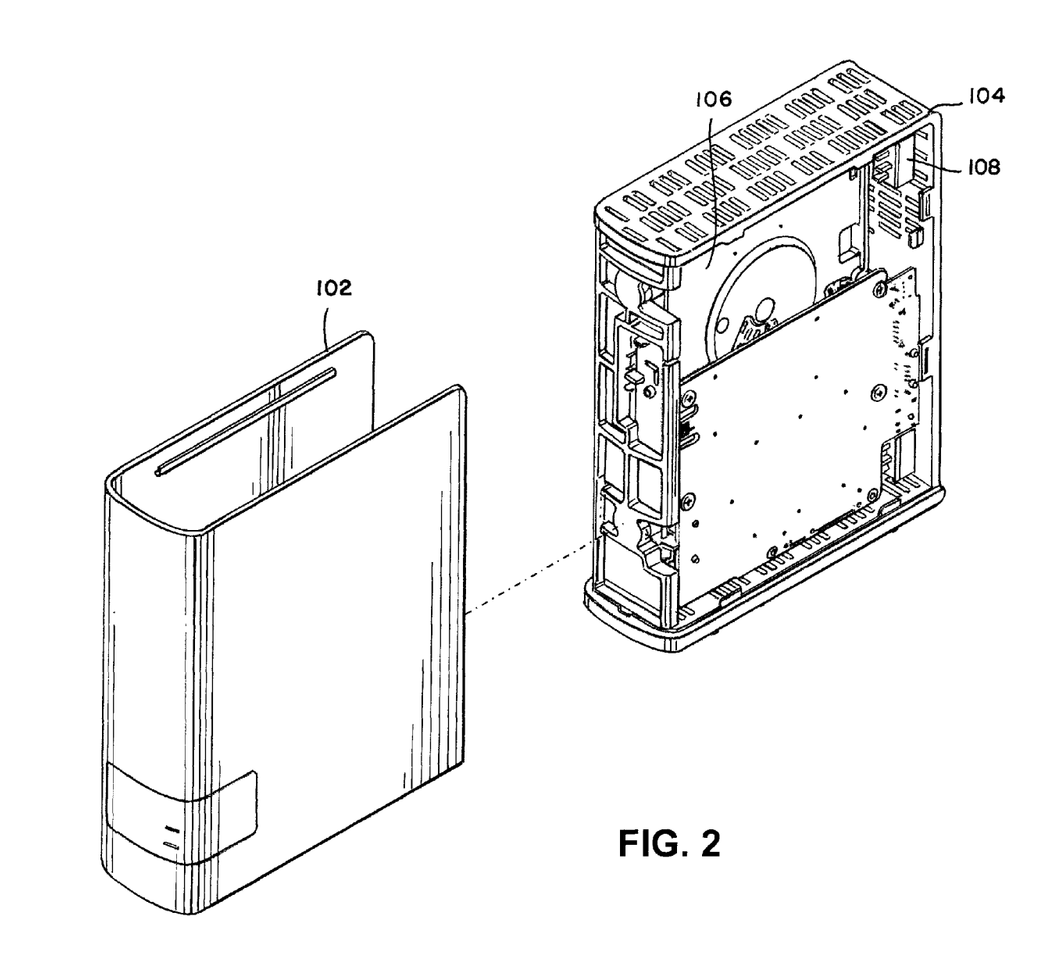
FIG. 2 depicts a data storage assembly with a cover separated from an enclosure according to an embodiment.

Referring to the embodiment shown in FIG. 2, the cover 102 comprises a U-shaped cover. In an embodiment, the cover 102 is configured to be slid onto the enclosure 104 from the second side 116 (FIG. 3) of the enclosure 104 to the first side 114 (FIG. 3) of the enclosure 104. In an embodiment, the cover 102 is configured to slide onto the enclosure 104 in a direction substantially parallel to a central axis of the shock mounts 110. Although in the embodiments shown in the examples above depict a U-shaped cover, the cover 102 can comprise other shapes. For example, the cover 102 can be partially U-shaped, J-shaped, L-shaped, or substantially planar.

Figure 13:
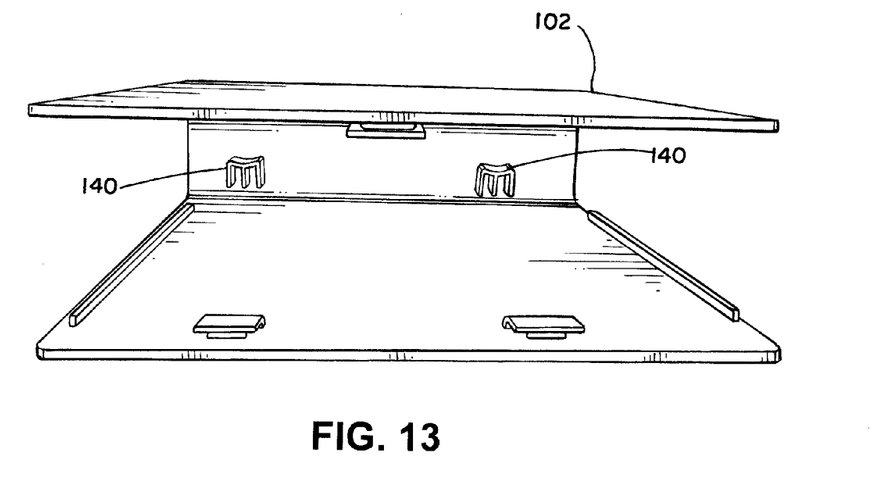
FIG. 13 depicts a side view of a cover comprising retention units.
Figure 14:
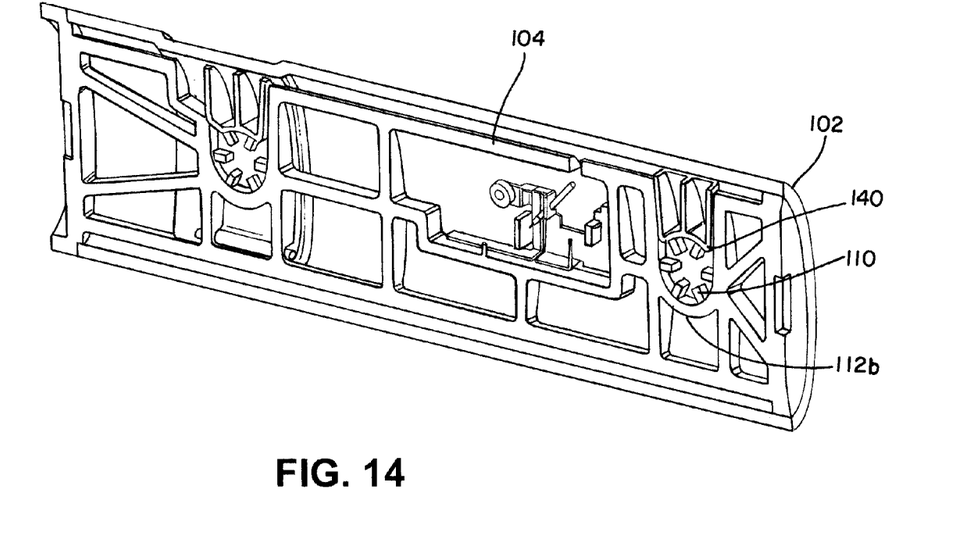
FIG. 14 depicts a partial view of an enclosure and a cover where retention units are cooperating with captivating pockets to captivate shock mounts.

In the embodiment shown in FIG. 13, the cover 102 comprises retention units 140 which can be mated with the captivating pockets 112b. Thus, when the cover 102 is slid onto the enclosure 104, the retention units 140 will cooperate with the captivating pockets 112b to captivate the shock mounts 110. In an embodiment, a perspective view of the retention units 140 and the captivating pockets 112b cooperating to captivate the shock mounts 110 is shown in FIG. 14.

In an embodiment, the retention units 140 do not comprise latches in order to the retention units 140 to be slid over the captivating pockets to captivate the shock mounts 110. Furthermore, this can also allow the cover 102 to be slid onto the enclosure 104. In an embodiment, the retention units 140 are not latched onto the captivating pockets 112b. Thus, in an embodiment, the retention units 140 do not need to include latching units such as the latching beams or the ramps on the latching beams. Furthermore, in an embodiment, the captivating pockets 112b do not need to include latching units such as the flanges. In addition, in an embodiment, the retention units 140 and the captivating pockets 112b do not include alignment features.

In an embodiment, retention clips 108 can be used instead of retention units 140. In such a case, the cover 102 would not need to comprise the retention units 140.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A data storage assembly comprising:
an enclosure comprising a first set of one or more pockets for receiving a first set of one or more shock mounts configured to be coupled to a data storage device;
a cover configured to enclose the enclosure; and
a set of one or more retention clips separate from the cover and configured to latch with the first set of one or more pockets to retain the first set of one or more shock mounts.

2. The data storage assembly of claim 1 wherein a retention clip in the set of one or more retention clips further comprises:
a shock mount retention surface configured to contact a shock mount in the first set of one or more shock mounts when the retention clip is latched to a corresponding pocket in the first set of one or more pockets; and
one or more radial ribs opposite the shock mount retention surface and configured to reduce deformation of the shock mount retention surface.

3. The data storage assembly of claim 2 wherein the one or more radial ribs extend radially from the shock mount retention surface.

4. The data storage assembly of claim 1 wherein the first set of one or more pockets comprise a first set of one or more latching units, and the set of one or more retention clips comprise a second set of one or more latching units, wherein the first set of one or more latching units and the second set of one or more latching units are configured to cooperate with each other to latch the first set of one or more pockets with the set of one or more retention clips.

5. The data storage assembly of claim 4 wherein a first latching unit in the first set of one or more latching units comprises a flange, and a second latching unit in the second set of one or more latching units comprises a beam and a ramp extending from the beam, wherein the ramp and the flange cooperate with each other to latch the first latching unit to the second latching unit.

6. The data storage assembly of claim 1 wherein the first set of one or more pockets comprise a first set of one or more alignment units, and the set of one or more retention clips comprise a second set of one or more alignment units, wherein the first set of one or more alignment units and the second set of one or more alignment units are configured to cooperate with each other to align the first set of one or more pockets with the set of one or more retention clips.

7. The data storage assembly of claim 1 wherein a pocket in the first set of one or more pockets comprises a partially circular surface for contacting a shock mount in the first set of one or more shock mounts.

8. The data storage assembly of claim 1 wherein the enclosure further comprises a second set of one or more pockets for receiving a second set of one or more shock mounts.

9. The data storage assembly of claim 8 wherein the cover comprises a set of one or more retention units configured to cooperate with the second set of one or more pockets to retain the second set of one or more shock mounts.

10. The data storage assembly of claim 1 wherein the cover is further configured to slide onto the enclosure in a direction substantially parallel to a central axis of the first set of one or more shock mounts.

11. The data storage assembly of claim 1 further comprising the data storage device, the data storage device comprising a disk drive.

12. A retention clip for retaining a shock mount comprising:
 a shock mount retention surface configured to contact a shock mount configured to be coupled to a data storage device;
 one or more radial ribs opposite the shock mount retention surface and configured to reduce deformation of the shock mount retention surface; and
 a latching unit configured to latch with a pocket in an enclosure for the data storage device to retain the shock mount.

13. The retention clip of claim 12 wherein the one or more radial ribs extend radially from the shock mount retention surface.

14. The retention clip of claim 12 further comprising an alignment unit configured to align the retention clip with the pocket.

15. The retention clip of claim 12 wherein the latching unit comprises:
 a beam; and
 a ramp extending from the beam, wherein the ramp and a flange on the pocket cooperate with each other to latch the latching unit with the pocket.

16. A data storage assembly comprising:
 a data storage device comprising a first side and a second side opposite the first side;
 a first set of one or more shock mounts configured to be coupled to the first side of the data storage device;
 a second set of one or more shock mounts configured to be coupled to the second side of the data storage device;
 an enclosure comprising a first set of one or more pockets for receiving the first set of one or more shock mounts and a second set of one or more pockets for receiving the second set of one or more shock mounts;
 a cover configured to enclose the enclosure, wherein the cover comprises a set of one or more retention units configured to cooperate with the second set of one or more pockets to retain the second set of one or more shock mounts; and
 a set of one or more retention clips separate from the cover and configured to latch with the first set of one or more pockets to retain the first set of one or more shock mounts.

17. The data storage assembly of claim 16 wherein a retention clip in the set of one or more retention clips further comprises:
 a shock mount retention surface configured to contact a shock mount in the first set of one or more shock mounts when the retention clip is latched to a corresponding pocket in the first set of one or more pockets; and
 one or more radial ribs opposite the shock mount retention surface and configured to reduce deformation of the shock mount retention surface.

18. The data storage assembly of claim 16 wherein the first set of one or more pockets comprise a first set of one or more latching units, and the set of one or more retention clips comprise a second set of one or more latching units, wherein the first set of one or more latching units and the second set of one or more latching units are configured to cooperate with each other to latch the first set of one or more pockets with the set of one or more retention clips.

19. The data storage assembly of claim 16 wherein a pocket in the first set of one or more pockets comprises a partially circular surface for contacting a shock mount in the first set of one or more shock mounts.

20. The data storage assembly of claim 16 wherein the cover is further configured to slide onto the enclosure in a direction substantially parallel to a central axis of the first set of one or more shock mounts.

21. The data storage assembly of claim 16 wherein the data storage device further comprises a disk drive.

* * * * *